United States Patent
De Bondt et al.

(10) Patent No.: US 10,951,129 B2
(45) Date of Patent: Mar. 16, 2021

(54) APPARATUS AND SYSTEM FOR PROVIDING A POWER CONVERTER

(71) Applicant: SIGNIFY HOLDING B.V., Eindhoven (NL)

(72) Inventors: Guy Louis Paul De Bondt, Herentals (BE); Theo Gerrit Zijlman, Tilburg (NL); Georg Sauerlander, Attendorn (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/624,832

(22) PCT Filed: Jun. 12, 2018

(86) PCT No.: PCT/EP2018/065448
§ 371 (c)(1),
(2) Date: Dec. 19, 2019

(87) PCT Pub. No.: WO2018/234091
PCT Pub. Date: Dec. 27, 2018

(65) Prior Publication Data
US 2020/0119657 A1    Apr. 16, 2020

(30) Foreign Application Priority Data
Jun. 20, 2017  (EP) ..................... 17176964

(51) Int. Cl.
*H05B 45/30* (2020.01)
*H02M 7/162* (2006.01)
(Continued)

(52) U.S. Cl.
CPC ............ *H02M 7/162* (2013.01); *H05B 45/37* (2020.01); *H02M 2001/009* (2013.01)

(58) Field of Classification Search
CPC .. H02M 1/425; H02M 1/4241; H02M 1/4258; H02M 7/162; H05B 33/0809;
(Continued)

(56) References Cited

U.S. PATENT DOCUMENTS

| | | | |
|---|---|---|---|
| 5,119,013 A | 6/1992 | Sabroff | |
| 2009/0303762 A1* | 12/2009 | Jang | .................... H02M 1/4208 363/61 |

(Continued)

FOREIGN PATENT DOCUMENTS

| | | |
|---|---|---|
| DE | 19604026 A1 | 8/1997 |
| EP | 0420074 A1 | 4/1991 |

(Continued)

OTHER PUBLICATIONS

Anonymous: "Full Wave Rectifier", Electronics-tutorials, XP002783325, URL://www.electronics-tutorials.ws/diode/diode_6.html. (retrieved on Jul. 25, 2018).

*Primary Examiner* — Tung X Le
(74) *Attorney, Agent, or Firm* — Daniel J. Piotrowski

(57) ABSTRACT

An AC input power converter comprising a rectifier circuit (D3, D4, D5, D6) for rectifying an AC input signal, a first unidirectional device (D1) coupled in series with a first capacitor (C1) for charging the first capacitor (C1) and wherein the first unidirectional device (D1) and the first capacitor (C1) are arranged in parallel to an output of the rectifier circuit (D3, D4, D5, D6), a second unidirectional device (D2) coupled in series with a second capacitor (C2) for charging the second capacitor (C2) and wherein the second unidirectional device (D2) and the second capacitor (C2) are arranged in parallel to an output of the rectifier circuit (D3, D4, D5, D6), a first output (OUT1) for providing a first power and a first average voltage to a first power converter, wherein the first output (OUT1) s coupled to a first node between the first capacitor (C1) and the first (Continued)

unidirectional device (D1) and a second output (OUT2) for providing a second power and a second average voltage to a second power converter, wherein the second output (OUT2) is coupled to a second node between the second capacitor (C2) and the second unidirectional device (D2), wherein the first capacitor (C1) has a first value and the second capacitor (C2) has a second value, and wherein the first value of the first capacitor and the second value of the second capacitor are selected such that when the first power is lower than the second power, the first average voltage is larger than the second average voltage, and when the first power is larger than the second power, the first average voltage is lower than the second average voltage.

8 Claims, 3 Drawing Sheets

(51) Int. Cl.
  *H05B 45/37*  (2020.01)
  *H02M 1/00*  (2006.01)
(58) Field of Classification Search
  CPC ............ H05B 33/0818; H05B 33/0878; H05B 33/0887; H05B 45/37

USPC ................... 315/193, 206, 291; 363/24, 126
See application file for complete search history.

(56) References Cited

U.S. PATENT DOCUMENTS

| | | |
|---|---|---|
| 2010/0054007 A1 | 3/2010 | Jung |
| 2011/0175510 A1* | 7/2011 | Rains, Jr. .................. F21K 9/27 313/32 |
| 2011/0266970 A1* | 11/2011 | Cohen .................... H05B 45/37 315/294 |
| 2014/0145632 A1* | 5/2014 | Wey ....................... H05B 45/37 315/193 |
| 2015/0022108 A1* | 1/2015 | Malyna .............. H05B 45/3575 315/200 R |
| 2017/0302160 A1* | 10/2017 | Marcinkiewicz ....... H02M 1/44 |
| 2018/0343057 A1* | 11/2018 | Seki ....................... H05B 47/19 |

FOREIGN PATENT DOCUMENTS

| | | |
|---|---|---|
| EP | 2712074 A1 | 3/2014 |
| FR | 1422 994 A | 1/1996 |

* cited by examiner

APPARATUS AND SYSTEM FOR PROVIDING A POWER CONVERTER

CROSS-REFERENCE TO PRIOR APPLICATIONS

This application is the U.S. National Phase application under 35 U.S.C. § 371 of International Application No. PCT/EP2018/065448, filed on Jun. 12, 2018, which claims the benefit of European Patent Application No. 17176964.9, filed on Jun. 20, 2017. These applications are hereby incorporated by reference herein.

FIELD OF THE INVENTION

The Invention relates to a power converter. The invention further relates to a system comprising the power converter, a first load and a second load.

BACKGROUND OF THE INVENTION

Light-emitting diodes (LEDs) are used as a kind of solid-state light source. Compared with conventional lighting, such as incandescent or fluorescent lamps, its advantages are compactness, high efficacy, good color, various and variable color, etc. LEDs are widely used in indoor lighting, decoration lighting and outdoor lighting.

The efficiency of the LEDs keeps on increasing, which increases the efficiency of lighting device during operating mode. However, nowadays, further requirements are put on the stand-by power of a lighting device comprising LEDs. Since the LEDs are turned off during stand-by, the energy consumption of the lighting device is mainly depending on the power converter and the load present at stand-by. Such a stand-by load can be for example wireless communication components, microcontrollers or other components to make sure the lighting device is capable to recover from a stand-by mode. A lot of effort has already been done on improving the efficiency of the stand-by load.

US 2010/0054007 discloses a power supply apparatus with low power in a standby mode. The apparatus includes a voltage multiplier configured to multiply an input voltage and including a first terminal through which the multiplied voltage is output and a second terminal through which a voltage lower than a voltage of the first terminal is output; a main switch-mode power supply (SMPS) configured to receive the voltage of the first terminal of the voltage multiplier; and a standby SMPS configured to receive a voltage of the second terminal of the voltage multiplier.

SUMMARY OF THE INVENTION

It is an object of the invention to provide a converter and a corresponding lighting device, which have a reduced power consumption during stand-by mode and hence have an increased efficiency during the stand-by mode. According to a first aspect of the present invention, an AC input power converter is provided comprising:
  a rectifier circuit for rectifying an AC input signal,
  a first unidirectional device coupled in series with a first capacitor for charging the first capacitor and wherein the first unidirectional device and the first capacitor are arranged in parallel to an output of the rectifier circuit,
  a second unidirectional device coupled in series with a second capacitor for charging the second capacitor and wherein the second unidirectional device and the second capacitor are arranged in parallel to an output of the rectifier circuit,
  a first output for providing a first power and a first average voltage to a first power converter, wherein the first output is coupled to a first node between the first capacitor and the first unidirectional device, and
  a second output for providing a second power and a second average voltage to a second power converter, wherein the second output is coupled to a second node between the second capacitor and the second unidirectional device,
  wherein the first capacitor has a first value and the second capacitor has a second value, and
  wherein the first value of the first capacitor and the second value of the second capacitor are selected such that:
  when the first power is lower than the second power, the first average voltage is larger than the second average voltage, and
  when the first power is larger than the second power, the first average voltage is lower than the second average voltage.

In other words, the AC input power converter is arranged for operating in two modes wherein the second value of the second capacitor is selected such that:
  in a first mode, wherein a first power to the first output is lower than a second power at the second output and wherein an average (such as a root-mean-square) of a voltage at the first output is larger than an average (such as a root-mean-square) of a voltage at the second output; and
  in a second mode, wherein the first power to the first output is larger than the second power to the second output and wherein an average (such as a root-mean-square) of the voltage at the first output is smaller than an average (such as a root-mean-square) of the voltage at the second output.

By separating the voltages of the first output and the second output, the voltage at the second output can have a lower average value than when the voltage at the second output would follow the voltage at the first input. In the first mode, the lower average voltage at the second output allows a more efficient power conversion to be performed at the second output.

In one embodiment, the AC input converter is in a stand-by mode when no power is supplied to the first output and the AC input converter is a normal-operating mode when operating power is provided to the first output.

In other words, the first mode is a stand-by mode wherein no power is supplied to the first output and wherein the second mode is a normal-operating mode wherein operating power is provided to the first output.

The majority of the power consumption of the power converter in stand-by mode is drawn by the second output. To improve the stand-by power consumption efficiency, the average voltage at the second output has to be lowered. This can be obtained by changing the capacitor value of the second capacitor.

In one embodiment, the second capacitor is smaller in value than the first capacitor.

Usually, the first capacitance is already low in value since the power factor of the power converter is preferably high. Now that the second capacitor is even lower in value, in the first mode, the voltage over this capacitor is likely to have a larger swing resulting in a lower average voltage over the second capacitor.

In another embodiment, the unidirectional devices in the power converter comprise or are diodes.

This results in an easy implementation of unidirectional devices. Other examples of unidirectional devices are MOS-FETs and thyristors, which are configured to act as a unidirectional device.

In a further embodiment, the power converter further comprises a controller arranged for controlling a first power converter, wherein the controller is coupled to the second power converter for receiving the second power.

This controller always consumes some power when the AC input power converter is turned off. For example, when the controller is arranged to receive a wireless signal, the controller has to be able to receive the signal even when the AC input power converter is in stand-by mode. The second output power, also referred to as auxiliary power, is provided when the AC input power converter is in normal operating mode and in stand-by mode. In the normal operating mode, this output power is relatively low when compared to the power required at the first output.

In a further embodiment, a system is provided comprising:
an AC power converter according to any of the preceding claims,
a first power converter coupled to the first output; and
a second power converter coupled to the second output.

This system has an improved standby power for the second power converter since the average voltage level provided to the second power converter is reduced. Since the voltage at the first output and the second output are separated, the average voltage at the first output and the second output may be different. In prior art power converters, the voltage at the first output and the second output is coupled. Therefore, the voltage at the second output follows the voltage of the first output. In a stand-by mode, the average voltage at the second output will therefore be near the peak input voltage level of the input voltage since the power converter consumes a relative low power.

When the first and second output voltages are separated, the capacitor at the second output can be chosen such that the voltage at the second output comprises a ripple resulting in a lower average voltage. Since in stand-by, the first output will not draw any significant power, the majority of the power consumption will be at the second output. Having a lower average voltage at the second output will then result in a more efficient power conversion at the second output.

In a further embodiment, the system is arranged such that the first load comprises the further power converter for driving an LED load and the second load comprises an auxiliary power converter for driving the control circuit of the first mentioned power converter.

BRIEF DESCRIPTION OF THE DRAWINGS

An example of the invention will now be described in detail with reference to the accompanying drawing, in which.

DETAILED DESCRIPTION OF THE EMBODIMENTS

AC input power converters are designed to have an optimized power efficiency at their nominal working load. When there is no main load present due to prevention of power flowing to the main load, e.g. a user requires no load to be active, some stand-by loads may still be active. For example in lighting applications, a wireless communication with a host or any other communication device may still be present. Another example of a stand-by load can be a microcontroller waiting for a signal to provide power to the main load. The power consumption of the stand-by load is significantly smaller than the power consumption of the main load. As an example, the power consumption can be in the order of milliwatts where the power consumption of the main load can be in the range of Watts. Therefore, the power converter is not operating in its most optimum region and therefore, the power consumption of the power converter may be relatively high in stand-by operation.

Figure 1:
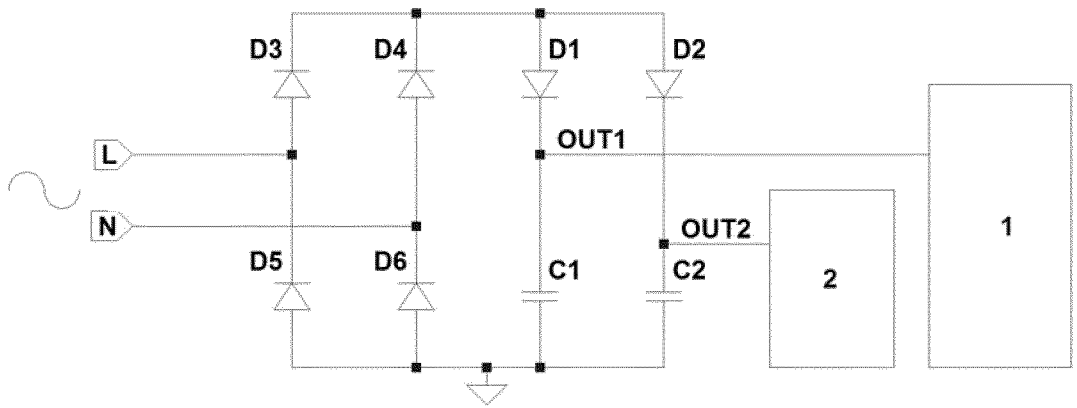
FIG. 1 shows an example of a converter according to the invention.

FIG. 1 shows an example of an AC input power converter as proposed by the invention. A rectifier D3, D4, D5 and D6 is connected via the input terminals L and N to an AC voltage source. The output of the rectifier is coupled to a first unidirectional device D1 and a second unidirectional device D2. The first unidirectional device D1 is coupled to a first capacitor C1 and the second unidirectional device D2 is coupled to a second capacitor C2. A first output Out 1 is coupled at a node between the first unidirectional device D1 and the first capacitor C1. A second output Out 2 is coupled at a node between the second unidirectional device D2 and the second capacitor C2. A first load 1 may be coupled to the first output 1 and a second load 2 may be coupled to the second output 2.

According to FIG. 1 an improvement with respect to the power consumption of the AC input power converter during stand-by mode is made by introducing an auxiliary power supply, also referred to as the second power converter, in the second load 2 next to the main power supply, also referred to as the first power converter, in the first load 1. This auxiliary power supply is optimized to provide power to the stand-by load at the second output. Therefore, when the AC input power converter goes into stand-by mode, the auxiliary power supply will provide the power to the stand-by load and therefore, the overall efficiency during stand-by of the auxiliary power supply improves.

Further improving the efficiency of the auxiliary power supply can be done by cleverly selecting the capacitance value of capacitor C2. Normally, the value of the capacitor C2 is chosen such that the voltage fluctuation over the capacitor C2 is minimized. When the value of capacitor C2 is chosen smaller such that the voltage over the capacitor C2 has a larger fluctuation, the average voltage will be lower. The efficiency of the voltage conversion of the auxiliary power supply depends on the ratio of the average input voltage versus the average output voltage. Now that the average input voltage has been lowered, the efficiency of the auxiliary power supply is increased.

The AC input power converter further provides a first power to the first load 1 via the first output. The first load 1 may comprise a further power converter coupled to the input capacitor C1. The capacitor C1 and the further power converter are supplied by the first power through the rectifier bridge D3, D4, D5, D6 and diode D1. In stand-by, the capacitor C1 will not be discharged by the further power converter since the LED load does not require any power. The diode D1 is arranged such that the discharge of capacitor C1 to capacitor C2 is prevented.

Diode D2 may be introduced to prevent power flowing from capacitor C2 to C1 during normal operating mode. In this situation, the auxiliary power supply 2 and the capacitor C2 are supplied by a mains power supply through a rectifier bridge D3, D4, D5, D6 and diode D2.

The AC input power converter may further comprise a controller that is arranged to control the first power converter. The controller is then coupled to the second output such that a supply of power can be provided via the second output to the controller. The controller is then supplied with power both when the AC input power converter is in the operating mode and in the stand-by mode. The controller can be arranged to receive light setting commands. These signals can be provided via a wired or a wireless communication line.

The AC input power converter can be used in a light emitting device. This light emitting device might be controlled via a wireless signal. The light emitting device may comprise the AC input power converter, a first power converter and a second power converter. The first power converter is coupled to the first output of the AC input power converter. The first power converter can be arranged to drive an LED load. During the operating mode of the AC input power converter, power is provided to the first power converter. During the stand-by mode of the AC input power converter, no power is provided to the first power converter resulting in no light emission of the LED load. The second power converter may be arranged to drive an auxiliary load. The auxiliary load may for example be the controller. Power is provided to the second power converter both during the normal operating mode and the stand-by mode of the AC input power converter.

Figure 2:
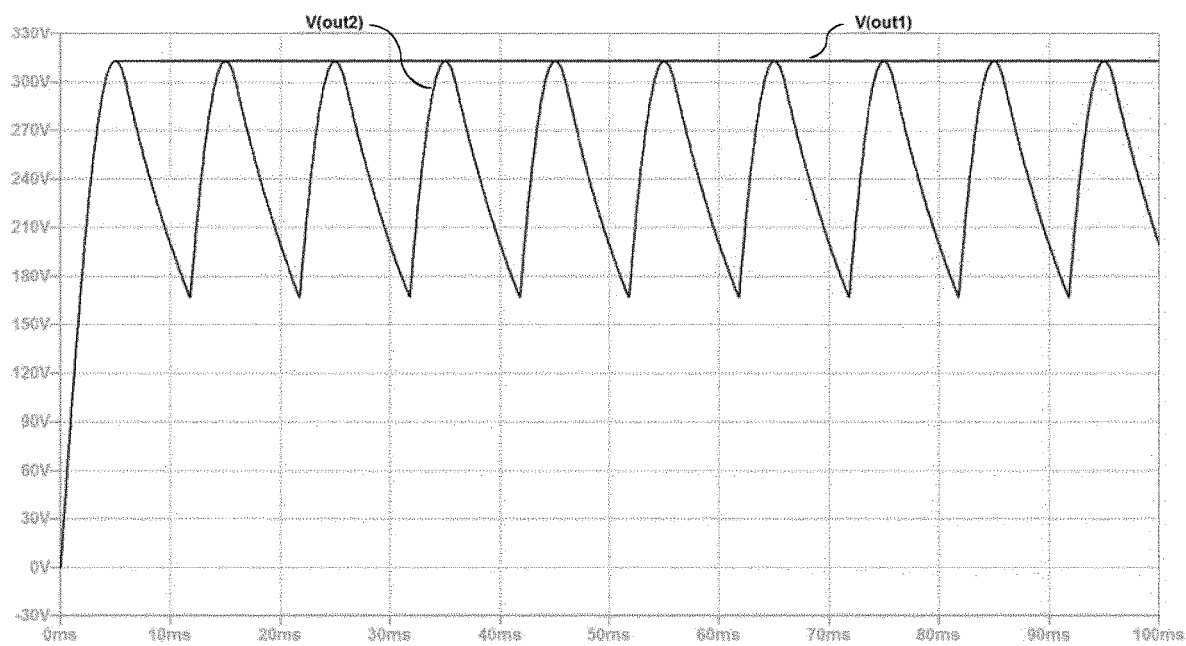
FIG. 2 shows waveforms of the voltages at the first output and the second output during the first mode.

In FIG. 2, an example of the first output voltage and the second output voltage waveforms is shown when the AC input power converter is in the first mode. The first mode may be the stand-by mode wherein no power is drawn at the first output. It can be observed that the average voltage at the first output Vout 1 has a larger average value than the average voltage at the second output Vout 2. The power consumption at the second output can be the same as the power consumption in the second mode.

Figure 3:
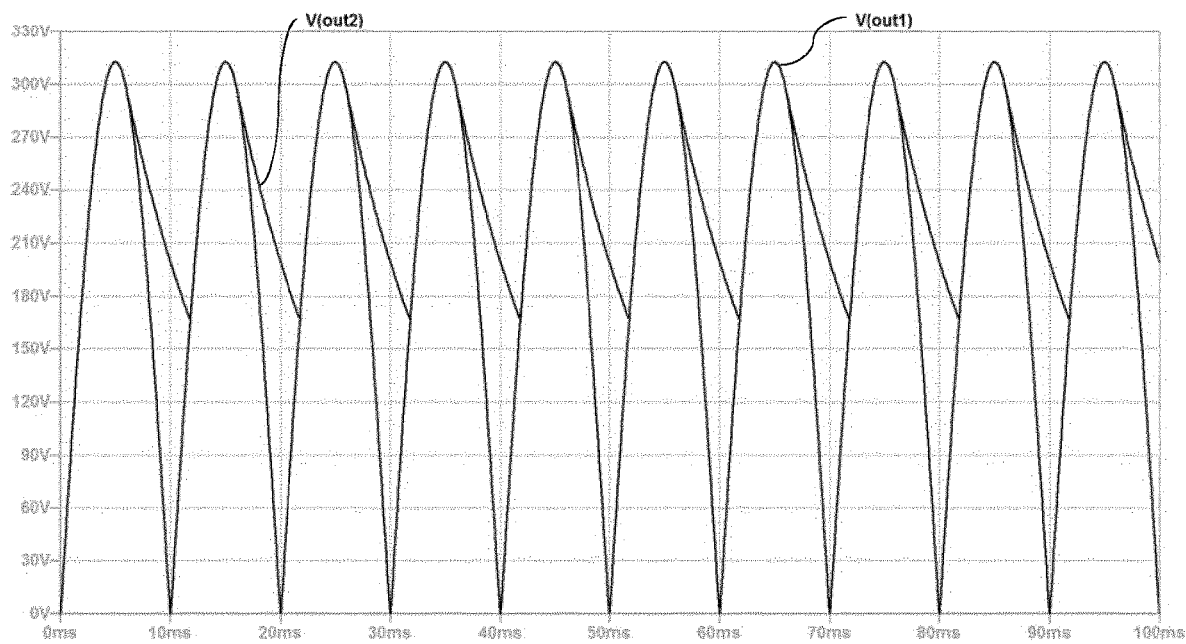
FIG. 3 shows waveforms of the voltages at the first output and the second output during the second mode.

In FIG. 3, an example of output voltage waveforms is shown when the AC input power converter is in the second mode. The second mode can be the normal operating mode wherein a large power is drawn at the first output. It can be observed that the average voltage at the first output Vout 1 is smaller than the average voltage at the second output Vout 2.

The actual value of the capacitor C2 depends on the actual implementation of the AC input converter and will be influenced by the powers drawn at the first output and the second output in the two different operating modes.

In FIG. 1, a full wave rectifier D3, D4, D5, D6 has been shown. However, any type of voltage rectification can be implemented. Another example may be a half wave rectifier wherein only half of the mains cycle will be rectified and the other half will be blocked.

It has to be noted that the diodes as described above are all unidirectional devices that can be replaced by other types of unidirectional devices such as MOSFETs and thyristors, configured or controlled to behave as a unidirectional device.

The invention claimed is:

1. An AC input power converter having an operation mode and a stand-by mode, the AC input power converter comprising:
a rectifier circuit for rectifying an AC input signal;
a first unidirectional device coupled in series with a first capacitor for charging the first capacitor and wherein the first unidirectional device and the first capacitor are arranged in parallel to an output of the rectifier circuit;
a second unidirectional device coupled in series with a second capacitor for charging the second capacitor and wherein the second unidirectional device and the second capacitor are arranged in parallel to an output of the rectifier circuit;
a first output for providing a first power and a first average voltage to a first power converter, wherein the first output is coupled to a first node between the first capacitor and the first unidirectional device; and
a second output for providing a second power and a second average voltage to a second power converter, wherein the second output is coupled to a second node between the second capacitor and the second unidirectional device,
wherein the first capacitor has a first value and the second capacitor has a second value, and
wherein the first value of the first capacitor and the second value of the second capacitor are selected such that:
when the first power is lower than the second power, the first average voltage is larger than the second average voltage,
when the first power is larger than the second power, the first average voltage is lower than the second average voltage; and
wherein the first power and the first average voltage is provided to the first power converter in the operation mode and the second power and the second average voltage is provided to the second power converter in the stand-by mode.

2. The AC input power converter according to claim 1 wherein the AC input converter is in a stand-by mode wherein no power is supplied to the first output and wherein the AC input converter is a normal-operating mode wherein operating power is provided to the first output.

3. The AC input power converter according to claim 1 wherein the second value is smaller than the first value.

4. The AC input power converter according to claim 1 wherein both the first unidirectional device and the second unidirectional device comprise a diode.

5. The AC input power converter according to claim 1 wherein the power converter further comprises a controller arranged for controlling the first power converter, wherein the controller is coupled to the second power convert for receiving the second power.

6. A system comprising:
an AC input power converter according to claim 1,
a first power converter coupled to the first output; and
a second power converter coupled to the second output.

7. The AC input power converter according to claim 1 wherein the first unidirectional device prevents power flow from the second capacitor to the first capacitor during the operating mode.

8. The AC input power converter according to claim 1 wherein the second unidirectional device prevents power flow from the first capacitor to the second capacitor during the stand-by mode.

* * * * *